United States Patent
Oberberger et al.

(10) Patent No.: US 6,341,495 B1
(45) Date of Patent: Jan. 29, 2002

(54) METHOD FOR AUTOMATICALLY CONTROLLING THE TEMPERATURE OF THE INTERIOR OF MOTOR VEHICLES

(75) Inventors: Stefan Oberberger, Gilching; Michael Heil, Markt Schwaben, both of (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/551,607

(22) Filed: Apr. 17, 2000

(30) Foreign Application Priority Data

Apr. 17, 1999 (DE) .......................... 199 17 502

(51) Int. Cl.⁷ ............................................ F25D 17/04
(52) U.S. Cl. ........................................................ 62/186
(58) Field of Search .......................... 62/186, 187, 177, 62/132; 236/DIG. 13, 45, 46 R; 165/202, 204, 206, 213, 228, 248, 249, 250, 267, 268

(56) References Cited

U.S. PATENT DOCUMENTS

| | | | |
|---|---|---|---|
| 4,186,564 A | * | 2/1980 | Myers .......................... 62/180 |
| 4,241,587 A | * | 12/1980 | Dienemann et al. ........... 62/80 |
| 4,291,544 A | * | 9/1981 | Larsen ......................... 62/221 |
| 4,324,286 A | * | 4/1982 | Brett ............................. 165/2 |
| 4,482,092 A | * | 11/1984 | Biber et al. ............ 237/12.3 B |
| 4,506,514 A | * | 3/1985 | Lamar et al. .................. 62/91 |
| 4,513,808 A | * | 4/1985 | Ito et al. ....................... 165/43 |
| 4,996,849 A | * | 3/1991 | Burst et al. .................... 62/133 |
| 5,001,905 A | * | 3/1991 | Miyazaki ...................... 62/244 |
| 5,293,928 A | * | 3/1994 | Iida et al. ..................... 165/8.5 |
| 5,720,181 A | * | 2/1998 | Karl et al. ..................... 62/180 |
| 6,077,158 A | * | 6/2000 | Lake et al. .................... 454/70 |
| 6,119,473 A | * | 9/2000 | Kishita et al. ............. 62/228.4 |
| 6,145,325 A | * | 11/2000 | Hanselmann et al. .......... 62/84 |
| 6,179,044 B1 | * | 1/2001 | Tabara ......................... 165/42 |

OTHER PUBLICATIONS

VDI–Berichte, No. 515, 1984, pp. 161–165 entitled "Electronic Temperature Control—A Method for Improving the Comfort and the Operability of Vehicle Heaters" by F. Waldeyer et al.

VDI–Berichte, No. 515, 1984, pp. 167–173 entitled "Control Systems and Automatic Control Systems for Heating and Air–Conditioning Systems in Motor Vehicles" by R. Weible et al.

\* cited by examiner

*Primary Examiner*—Teresa Walberg
*Assistant Examiner*—Daniel Robinson
(74) *Attorney, Agent, or Firm*—Crowell & Moring LLP

(57) ABSTRACT

In a method for automatically controlling the temperature of the interior of motor vehicles via an electronically controlled air-conditioning system having an evaporator, devices for adjusting the fresh-air fraction and the circulating-air fraction in the vehicle interior, as well as devices for sensing the evaporator temperature, the interior temperature and the outside-air temperature, the recirculating-air fraction is increased when the following occurs: recirculating-air fraction is lower than 100%, the deviation of the actual interior temperature from the desired interior temperature exceeds a defined first threshold, the outside temperature remains essentially constant, and the evaporator temperature rises.

13 Claims, 1 Drawing Sheet

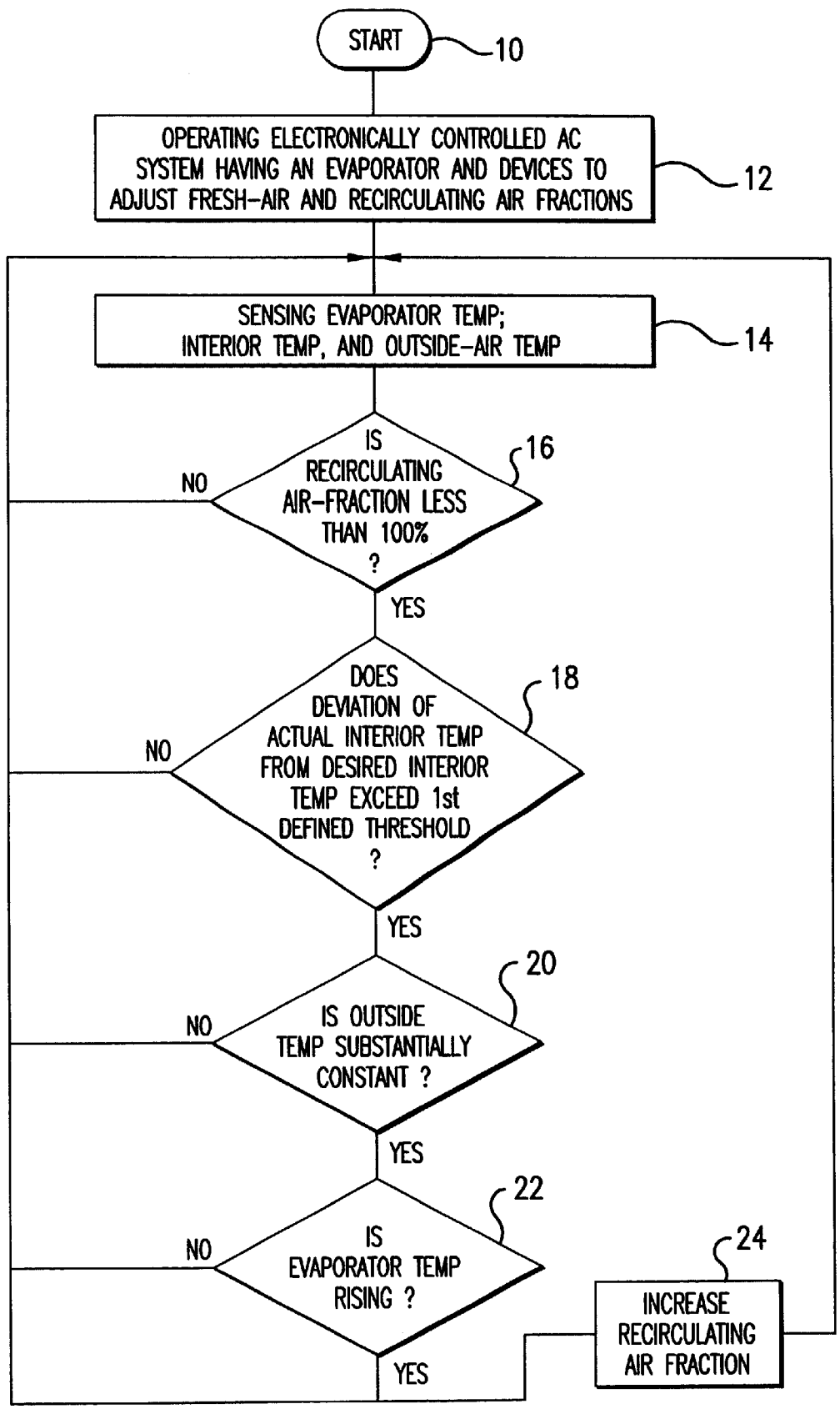

METHOD FOR AUTOMATICALLY CONTROLLING THE TEMPERATURE OF THE INTERIOR OF MOTOR VEHICLES

BACKGROUND AND SUMMARY OF THE INVENTION

This application claims the priority of German Application No. 199 17 502.0, filed Apr. 17, 1999, the disclosure of which is expressly incorporated by reference herein.

The invention relates to a method for automatically controlling the temperature of the interior of motor vehicles using an electronically controlled air-conditioning system having an evaporator, devices for adjusting the fresh-air fraction and the recirculating-air fraction in the vehicle interior, as well as devices for sensing an evaporator temperature, an interior temperature and an outside-air temperature.

Methods of this type have been known for some time. With respect to the technical background, reference is made, for example, to the articles "Electronic Temperature Control —A Method for Improving the Comfort and the Operability of Vehicle Heaters" (VDI-Berichte No. 515, 1984, Page 161) and "Control Systems and Automatic Control Systems for Heating and Air-Conditioning Systems in Motor Vehicles" (VDI-Berichte No. 515, 1984, Page 167).

In the cooling operation, at outside temperatures of above 25° C. and when the outside air humidity is high, air conditioners of this type (in the form of automatic interior temperature control systems) reach the lowest output temperatures using either a recirculating air operation or an increased recirculating-air fraction in comparison to the fresh-air fraction. In the case of known air-conditioners, the recirculating air fraction is therefore increased at temperatures of above 25° C. up to 100% when the deviation (Y) of the actual interior temperature from the desired interior temperature exceeds a defined threshold. However, by means of this control quantity Y, the outside air humidity cannot be determined, which nevertheless has a high influence on the control quality. Mainly in coastal regions with average outside temperatures of between 25° C. and 30° C. and a high outside air humidity, the known method results in a constant swinging back and forth between a recirculating-air operation and a fresh-air operation. This becomes noticeable to the vehicle occupants by rising ventilation outflow temperatures, fluctuating interior temperatures and a stuffy odor whenever the air conditioner switches off the recirculating-air operation or the recirculating-air fraction.

Furthermore, for avoiding the stuffy odor, the so-called reheat or counterheat method is known. In this case, by cooling the air to values barely above the zero point at the evaporator, the air is dried. As a function of the defined interior temperature, the dried and cooled air must then be heated again. This results in considerable expenditures of energy.

It is an object of the invention to eliminate the above-mentioned disadvantages and, particularly at a high outside air humidity, permit a comfortable and energy-conscious control.

This object is achieved by a method for automatically controlling the temperature of the interior of motor vehicles by means of an electronically controlled air-conditioning system having an evaporator, devices for adjusting the fresh-air fraction and the recirculating-air fraction in the vehicle interior, as well as devices for sensing the evaporator temperature, the interior temperature and the outside-air temperature. The recirculating-air fraction is increased: when the recirculating-air fraction is lower than 100%; when the deviation of the actual interior temperature from the desired interior temperature exceeds a defined first threshold, when the outside temperature remains essentially constant; and when the evaporator temperature rises. Advantageous further developments are described herein.

The known systems and methods for automatically controlling the inside temperatures of motor vehicles by means of an electronically controlled air-conditioning system normally already contain an evaporator, devices for adjusting the fresh-air fraction and the recirculating-air fraction in the vehicle interior as well as devices for sensing the evaporator temperature, the interior temperature and the outside-air temperature.

Other objects, advantages and novel features of the present invention will become apparent from the following detailed description of the invention when considered in conjunction with the accompanying drawings.

BRIEF DESCRIPTION OF THE DRAWING

FIG. 1 is a flow chart illustrating the method according to the invention.

DETAILED DESCRIPTION OF THE DRAWING

According to the present invention as shown in the flow chart of FIG. 1, the recirculating-air fraction is increased (step 24) using the existing devices when the recirculating-air fraction is lower than 100% (step 16); the deviation of the actual interior temperature from the desired interior temperature exceeds a defined first threshold (for example, 20%) (step 18); the outside temperature remains essentially constant (step 20); and the evaporator temperature rises (step 22).

In an especially preferred embodiment, the recirculating-air fraction will preferably be increased only when the outside temperature is higher than a defined second threshold (for example, 22° C.).

Also, in another embodiment of the invention, the circulating-air fraction can be increased as a function of or independently of the outside temperature, when the internal-combustion engine is in the idling operation. The reason is that the evaporator temperature rises not only at a high outside-air humidity because of the increasing refrigerating output which is required for the dehumidifying, but also in the idling operation because of a lack of a sufficient compressor output. The idling operation can be determined, for example, by way of the rotational speed of the internal-combustion engine (which is normally present anyhow as an electric input signal on the control unit used for such automatic controls).

The recirculating-air fraction is preferably reduced again when the evaporator temperature is no longer rising or the deviation of the actual interior temperature from the desired interior temperature falls below a defined third threshold (for example, 25%).

Furthermore, the fresh-air fraction can be increased for a defined first time period (for example, 60 s) after the recirculating-air fraction had been increased for longer than a defined second time period (for example, 10 min) to 100%. As a result, the demands can be met for providing a minimum outside air turnover; however, preferably only to such an extent that the vehicle occupants cannot notice the described impairment of comfort.

By means of this method according to the invention, energy is saved because of a lower refrigerating output demand for dehumidifying the air at the evaporator, and comfort is increased with respect to preventing odors and reaching a constant interior temperature, while the outside air humidity is higher.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Method for automatically controlling the temperature of the interior of motor vehicles using an electronically controlled air-conditioning system having an evaporator, devices for adjusting the fresh-air fraction and the recirculating-air fraction in the vehicle interior, as well as devices for sensing an evaporator temperature, an interior temperature and an outside-air temperature, the method comprising the acts of:

when the recirculating-air fraction is lower than 100%, determining whether the deviation of the actual interior temperature from the desired interior temperature exceeds a defined first threshold, the outside temperature remains essentially constant and the evaporator temperature rises; and increasing the recirculating-air fraction when the recirculating-air fraction is lower than 100%, the deviation of the actual interior temperature from the desired interior temperature exceeds the defined first threshold, the outside temperature remains essentially constant and the evaporator temperature rises.

2. Method according to claim 1, wherein the recirculating-air fraction is increased only when the outside air temperature is higher than a defined second threshold.

3. Method according to claim 1, wherein the recirculating-air fraction will be increased only when the internal-combustion engine is in an idling operation.

4. Method according to claim 2, wherein the recirculating-air fraction will be increased only when the internal-combustion engine is in an idling operation.

5. Method according to claim 1, wherein the recirculating-air fraction is reduced when the evaporator temperature does not rise anymore or the deviation of the actual interior temperature from the desired interior temperature falls below a defined threshold.

6. Method according to claim 2, wherein the recirculating-air fraction is reduced when the evaporator temperature does not rise anymore or the deviation of the actual interior temperature from the desired interior temperature falls below a defined threshold.

7. Method according to claim 3, wherein the recirculating-air fraction is reduced when the evaporator temperature does not rise anymore or the deviation of the actual interior temperature from the desired interior temperature falls below a defined threshold.

8. Method according to claim 4, wherein the recirculating-air fraction is reduced when the evaporator temperature does not rise anymore or the deviation of the actual interior temperature from the desired interior temperature falls below a defined threshold.

9. Method according to claim 1, wherein the fresh-air fraction is increased for a defined first time period after the recirculating-air fraction had been increased to 100% for longer than a defined second time period.

10. Method according to claim 2, wherein the fresh-air fraction is increased for a defined first time period after the recirculating-air fraction had been increased to 100% for longer than a defined second time period.

11. Method according to claim 3, wherein the fresh-air fraction is increased for a defined first time period after the recirculating-air fraction had been increased to 100% for longer than a defined second time period.

12. Method according to claim 4, wherein the fresh-air fraction is increased for a defined first time period after the recirculating-air fraction had been increased to 100% for longer than a defined second time period.

13. Method according to claim 5, wherein the fresh-air fraction is increased for a defined first time period after the recirculating-air fraction had been increased to 100% for longer than a defined second time period.

* * * * *